Sept 10, 1957  S. H. SACKER  2,806,121
ELECTRICIAN'S SOLDERING POT
Filed July 27, 1955

Stanley H. Sacker
INVENTOR

Frank C. Smaley
agent
BY

United States Patent Office 2,806,121
Patented Sept. 10, 1957

2,806,121

ELECTRICIAN'S SOLDERING POT

Stanley H. Sacker, New Orleans, La., assignor of one-half to Fannie F. Thomson, New Orleans, La.

Application July 27, 1955, Serial No. 524,763

2 Claims. (Cl. 219—26)

This invention relates to improvements in electrician's soldering pots for melting solder and other metals and is particularly directed to a novel electrically heated soldering or melting pot.

A primary object of this invention is to provide a soldering pot which is adapted to be attached to and heated by an electric soldering iron and which is mounted for swivel movement so as to always maintain a perpendicular position.

Another important object of this invention is to provide a supporting means for supporting a soldering pot for swivel movement and for conducting heat from an electric soldering iron to the pot.

A further important object of this invention is to provide a laminated yoke element of heat conducting material which has a heat conducing tong on its web portion for attachment to an electric soldering iron and which pivotally supports a soldering pot between its leg members so that the pot is in heat transfer relationship with the leg members and is mounted for free swinging movement to maintain a vertical position irrespective of the position of the yoke relative thereto.

A still further important object of this invention is to provide a compact, simple and highly effective soldering pot attachment for an electric soldering iron, which pot is particularly useful in soldering wire connections together, the connections being dipped into the pot and immersed in the melted solder. These and ancillary objects are attained by this invention, the preferred form of which is set forth in the following description and illustrated in the accompanying drawing, wherein.

Figure 1:
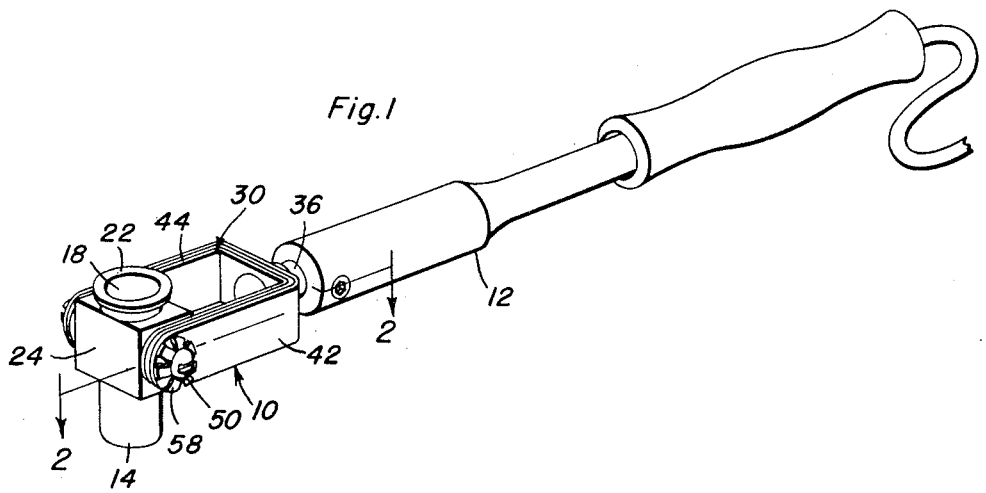
Fig. 1 is a perspective view of the soldering pot device in attachment to an electric soldering iron.
Figure 2:
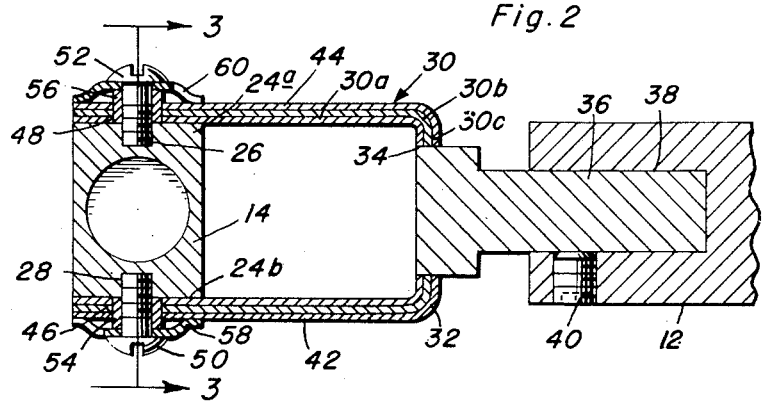
Fig. 2 is a longitudinal, horizontal sectional view taken on line 2—2 of Fig. 1.
Figure 3:
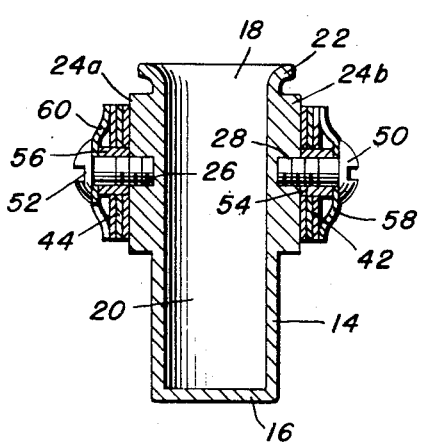
Fig. 3 is a transverse, vertical sectional view taken on line 3—3 of Fig. 2.

Referring now more particularly to the accompanying drawing, the numeral 10 generally designates the melting or soldering pot device of this invention, which device is particularly, though not exclusively, designed for use with and attachment to an electric soldering iron 12, the latter being of orthodox construction.

The device 10 includes a pot 14, which has a closed bottom wall 16 and an open top wall 18. The bore 20 of the pot is cylindrical and the upper edge 22 of the side wall is outwardly flared. The pot 14 has flat outer side walls 24, two of such walls 24a and 24b being opposed and being formed with opposed, threaded sockets 26 and 28.

A supporting laminated yoke member 30 is provided and is composed of a plurality of like layers or superimposed sections of heat conductive material. The yoke member, as shown in the drawing, is made up of three layers 30a, 30b and 30c which are similar in shape and are in intimate contact and form heat transfer fins. The yoke includes a web portion 32 which is formed with an aperture 34 in which one end of a heat conducting tong 36 is fitted. The tong is cylindrical in shape and is sized complemental to a socket 38 in the electrical heating iron. The socket normally receives the soldering tip (not shown) of the iron. A set screw 40 holds the tong in the socket.

The yoke member also includes opposing parallel leg sections 42 and 44, which are in spaced confronting relation and are formed, adjacent their outer free ends, with transverse openings 46 and 48 to receive trunnion screws 50 and 52.

The trunnion screws are passed through bearing sleeves 54 and 56, which are fitted in the openings 46 and 48, and are threaded in the sockets 26 and 28. The sleeves 54 and 56 are of a greater axial length than the widths of the leg sections so that they protrude outwardly therefrom and prevent the screws from being set up too tight and prevent the free swivel movement of the pot around the horizontal axis defined by the screws which rotate in the bearing sleeves. It is to be noted, in this respect, that the screws are located in alignment and rotate on a common axis which passes through the vertical center line of the pot at a point above the center of gravity of the pot.

Concavo-convex metal pressure washers 58 and 60 are installed under the heads of the screws and have separated radial peripheral segments which bear against the outer laminate of the leg sections to assure an even heat conducting contact between the laminated leg sections of the yoke and the flat, parallel sides or walls 24a and 24b of the pot. The peripheral edges of the segments are flat to bear against the outer surface of the laminated leg sections and the convex sides of the center portions of the washers bear against the heads of the screws.

The pot is, thus, mounted between the leg sections of the yoke for free swivel gravity induced movement so that it will always remain upright.

In use, the tong 36 is socketed in the socket 38 and held in place by the set screw. Solder is placed in the bore of the pot 14 and heat from the soldering iron is transferred through the tong and the laminated yoke 30 to the flat sides 24a and 24b of the pot. The pot is thus heated to melt the solder. Wire connections, for example, the twisted ends of copper wire splices for attachment in a terminal box, are then slipped into the melted solder in the pot.

The pot will always maintain a vertical position due to its rotatable mounting means and the pot will be evenly and quickly heated by the metal heat conductance.

While the device may be fabricated in one unit including the means of electrically heating the pot by enclosing the same with a heating element or by including a soldering iron as an integral part of the soldering pot, it is preferred to fabricate it in accordance with the present disclosure.

While the best known form and environment of this invention has been shown and described herein, other forms and uses may be realized as come within the scope of the invention, as defined by the appended claims.

What is claimed is:

1. For use with an electrical soldering iron having a heating end formed with a socket, a soldering pot attachment comprising a yoke member of heat conductive material and including a web portion and flat spaced apart, parallel legs, a tang of heat conductive material projecting rearwardly from the web portion and adapted to be fixedly socketed in the socket in the soldering iron, a melting pot having opposing flat sides formed with aligned threaded apertures which are positioned above the center of gravity of the pot at the vertical center line thereof, said legs having aligned transverse openings and means, including screws, passing through said openings and threaded in the apertures for mounting the pot for free rotation between the legs with the legs in intimate heat transfer relation with the sides of the pot, wherein said means further includes a pair of bearing sleeves circumposed on the screws and fitted in the openings in the legs and within which the screws rotate and concavo-convex washers fitted under the heads of the screws and bearing against the legs to hold the legs in intimate contact with the sides of the pot.

2. A soldering pot attachment as claimed in claim 1, wherein said yoke member is composed of a plurality of superimposed sections laminated together.

References Cited in the file of this patent

UNITED STATES PATENTS

| | | |
|---|---|---|
| 1,690,415 | Kuhn et al. | Nov. 6, 1928 |
| 1,745,455 | Seaborn | Feb. 4, 1930 |
| 2,460,685 | Ford | Feb. 1, 1949 |
| 2,502,764 | Taft | Apr. 4, 1950 |